United States Patent
Blau et al.

[15] 3,685,169
[45] Aug. 22, 1972

[54] TEACHING METHOD AND APPARATUS

[72] Inventors: Theodore H. Blau; Lawrence R. Bennett, both of Tampa, Fla.

[73] Assignee: Theodore Blau, Tampa, Fla.

[22] Filed: Jan. 22, 1970

[21] Appl. No.: 4,900

[52] U.S. Cl. ........................................35/8 R, 35/48 R
[51] Int. Cl. ..............................................G09b 7/06
[58] Field of Search ................35/9 R, 48 R, 8 R, 9 E

[56] References Cited

UNITED STATES PATENTS

| | | | |
|---|---|---|---|
| R23,030 | 8/1948 | Holt | 35/9 E |
| 3,100,352 | 8/1963 | Boissevain | 35/9 R |
| 3,252,229 | 5/1966 | Van Ostrom | 35/9 R |
| 2,062,453 | 12/1936 | Hastings | 35/9 R |

*Primary Examiner*—Wm. H. Grieb
*Attorney*—Lavine, Cantor & Reich

[57] ABSTRACT

A method of teaching wherein the span of attention of a student is determined by presenting the student with informational material and related questions in successive time periods, counting the number of questions answered and the number of erroneous answers in successive timer periods to determine when a significant increase in errors occurs, and thereafter presenting instructional material to the student only for his thus determined attention span. An apparatus including means for presenting instructional material and questions, means for counting questions and errors, and means for timing.

6 Claims, 6 Drawing Figures

PATENTED AUG 22 1972

INVENTORS
THEODORE H. BLAU
LAWRENCE R. BENNETT

BY *Lavine, Cantor & Reich*
ATTORNEY

| RUNS | TIME | FRAMES | ERRORS | RATIO |
|---|---|---|---|---|
| 1 | 3:00 | 6 | 0 | .00 |
| 2 | 6:00 | 8 | 0 | .00 |
| 3 | 9:00 | 8 | 2 | .25 |
| 4 | 12:00 | 7 | 0 | .00 |
| 5 | 15:00 | 10 | 0 | .00 |
| 6 | 18:00 | 7 | 3 | .42 |
| 7 | 21:00 | 11 | 1 | .09 |
| 8 | 24:00 | 7 | 0 | .00 |
| 9 | 27:00 | 4 | 1 | .25 |
| 10 | 30:00 | 6 | 0 | .00 |

| RUNS | TIME | FRAMES | ERRORS | RATIO |
|---|---|---|---|---|
| 1 | 3:00 | 10 | 1 | .10 |
| 2 | 6:00 | 11 | 0 | .00 |
| 3 | 9:00 | 10 | 0 | .00 |
| 4 | 12:00 | 9 | 0 | .00 |
| 5 | 15:00 | 11 | 0 | .00 |
| 6 | 18:00 | 11 | 1 | .09 |
| 7 | 21:00 | 11 | 0 | .00 |
| 8 | 24:00 | 9 | 2 | .22 |
| 9 | 27:00 | 10 | 0 | .00 |
| 10 | 30:00 | 12 | 1 | .08 |

INVENTORS
THEODORE H. BLAU
LAWRENCE R. BENNETT

TEACHING METHOD AND APPARATUS

BACKGROUND OF THE INVENTION

The present invention pertains to method and apparatus for teaching.

Teaching techniques and apparatus have only recently begun to be intensively and extensively developed. Up to about 1940, teaching was conventionally done by presenting material in a class room environment, wherein a number of students were assembled, and were orally instructed as a group by an instructor or teacher. Often books or the like were provided and the students were expected to initially learn the instructional material from the books, which material was reviewed and amplified by the instructor at a subsequent session of the class. Psychologists and educators were aware that generally speaking, young children around the age of six have a relatively short span of attention, so that instructional material was presented for only a relatively short time, for example, first grade teachers are advised that their students have a span of attention of only about 7 minutes. As children progress through the school system, the instructional material is presented over a longer period of time to the class, so that at the high school and college levels, the instructional material is presented by means of lectures, usually lasting 50 minutes. Underlying the above educational practice is the noted principle that younger students generally have a relatively short span of attention. Class room instruction was geared therefore, to providing instruction for a period of time related to the assumed attention span of the ages of the group of students being instructed.

In addition to instruction by an instructor or teacher physically in the class room and delivering a lecture, possibly with the use of visual supplementary material such as film slides, drawings, or the like, there has been evolved since about 1949, the utilization of machines to assist in the teaching process. Some of these machines have simply been question and answer machines, in which the students were individually presented with questions, and the answers, given in a "yes - no" or multiple choice manner could be recorded by mechanical or electrical means. Other teaching machines were of a different nature in that the actual instructional material was presented individually to students who could operate his own audio - visual equipment, by which term is meant such devices as sound records, usually of the magnetic tape type, and film strips with individual projectors. Some of these machines provided for control by the student to the extent that he could review a selected segment of the instructional material, whereas other machines provided material and also provided questions to be answered. In some instances, an incorrect answer by the student resulted in the presentation of the correct answer, and, optionally, additional instructional material upon the information which had been erroneously answered. This type of machine, therefore, was understood to provide "reinforcement", this being a term generally understood in the educational field to mean the rewarding, emphasizing or repetition of instructional material so that the learning process is enhanced or reinforced.

Common to all of the above techniques and apparatus was the presentation of the instructional material for a predetermined time which was either "clock related" or "material related" : by this is meant that the instructional material was presented for time periods of, for example, 1 hour, ½ hour, ¼ hour, or 10 minutes, or in the case of "material related", was presented for the length of time that was required for a particular audibly or visably recorded lesson. Consequently, an underlying deficiency in the above disclosed and heretofore known techniques and apparatus was the lack of correlation of the instructional time period with the time span of attention of the individual student.

It has been discovered that each individual, usually for a particular type of subject, has his own unique time span of attention, during which learning will be achieved at a suitably satisfactory rate, based upon the amount of material which the student can learn. Otherwise stated, it has been discovered that a student will be able to learn material, as shown by providing correct answers for a period of time unique to that individual, and that after that time period, learning proceeds at an inadequate rate, as indicated by a significant increase in the number of errors made, so that the presentation of additional instructional material after the individual student's time span of attention has elapsed will not result in the further learning of material by that student, but such presentation will, in fact, be found to be unproductive to the learning process. Underlying the discovery is the assumption, generally agreed to by educators and psychologists, that where a student performs with a minimum of error production, the material being presented is absorbed and the student is learning, but that where error production rises significantly, the student has ceased learning, and will thereafter not adequately learn from the instructional material presented in a satisfactory manner.

SUMMARY OF THE INVENTION

A student is presented with instructional or informational material, following which he is presented with a question related to that material, and thereupon answers the question. Once the answer is given by the student, there is thereby completed a single unit, herein called a "frame". Typically, a student is presented with informational material generally related to his educational level in the particular field, so that in a given time period, typically, 3 minutes, the student may be expected to accomplish approximately eight to 10 frames, and individual students may accomplish four to 15 frames. In each time period, the number of frames is counted, as are the number of errors. When the number of errors, relative to the number of frames, rises significantly in a time period, the student's span of attention has thereby been determined. Thereafter, the student is given instruction by the same information presentation and question and answer technique only for the thus determined time span of attention. Preferably, following the presentation of informational material during the individual's own time span of attention, the student is provided with non-instructional material for a short period of time, as for example, 2 to 4 minutes. This may be by means of, for example, films or unrelated subjects which have a duration of the noted approximately 2 to 4 minute time period. Following the non-instructional period, the student undergoes another instructional period, and again the instructional period lasts only as long as the predetermined individual time span of attention of the particular student.

Apparatus of the invention comprises essentially a suitable timing device, together with a counter for the number of "frames" and a counter for the number of errors.

DESCRIPTION OF THE PREFERRED EMBODIMENT

Figures 1, 2:
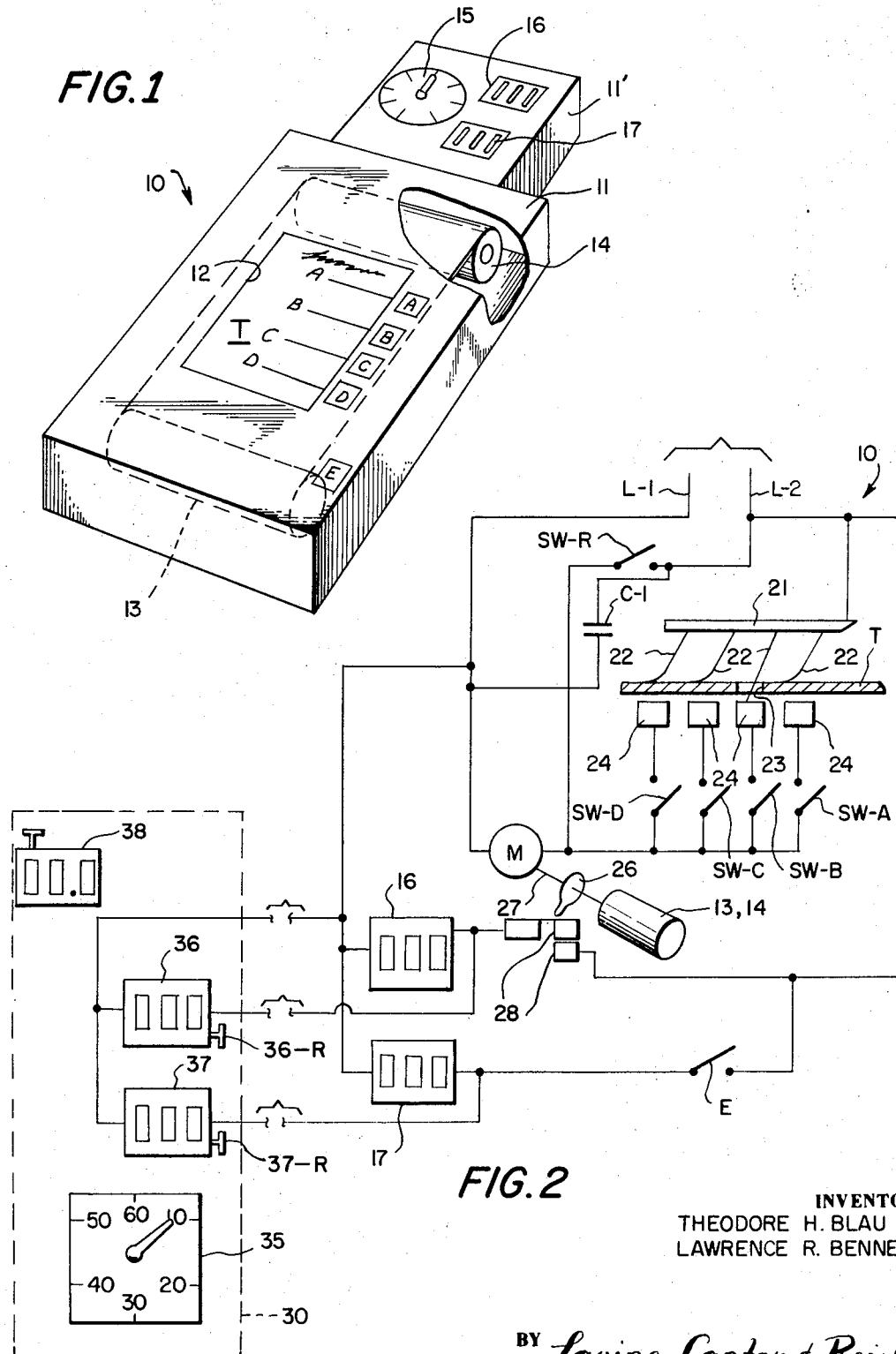
FIG. 1 is a perspective view of an information and question apparatus usable with the present invention.
FIG. 2 is a schematic view of circuitry apparatus included in the present invention.

Referring now to FIG. 1, there is shown apparatus generally designated 10 which is usable by a student. The apparatus 10 comprises a housing 11 with a window 12 in the upper surface thereof. Within the housing 11 are a pair of spools 13 and 14 for supporting a printed instructional tape T which is generally provided with a plurality of "frames", each of which is entirely visable, when properly positioned, through the window 12, and each of which provides a statement or other instructional material, in addition to a set of possible answers. As shown in FIG. 1, each of the answers is designated by a letter "A", "B", "C" and "D". In known fashion, a roll of the instructional tape T may be inserted into the housing 11, and threaded past and beneath the window 12, for winding onto a take-up roll.

The apparatus 10 is provided with a series of answer selection buttons correspondingly designated "A" . . . '' "D", and with an error button "E". On an extension of 11' of the housing 11 there are supported a timer 15, a frame counter 16 and an error counter 17.

Referring now to FIG. 2, there is shown in schematic form the apparatus 10, it being noted that there is disclosed in cross-section the instructional tape T. Electric power for the apparatus 10 is provided by the supply lines L-1 and L-2. A buss bar 21 is connected to line L-2, and has extending from it four spring contacts 22, one of which may be seen to extend through an opening 23 in the instructional tape T, making contact with one of four corresponding contact elements 24. Assuming that the opening 23 is opposite answer "B" as seen through the window 12 in FIG. 1, and that answer "B" is the correct answer, the student may push button "B" of FIG. 1 to thereby actuate the switch SW-B, to thereby complete a circuit through the motor M and to line L-1.

Energization of the motor M by the selection of the correct answer "B" will result in the rotation of the motor M to drive the spool system 13, 14, so as to advance the next frame into position beneath the window 12, by means well understood in the art. Rotation of the motor M will cause actuation of the frame counter 16 by any suitable mechanism, there being herein illustrated a cam 26 mounted on a shaft 27 driven by the motor M, and which, upon rotation, causes the closing of the switch contacts 28, thereby energizing counter 16 by the completion of a circuit from line L-2 through the contacts 28 and counter 16 to line L-1. Should the student press a button which is incorrect, so as to close either of switches SW-A, SW-C or SW-D, the circuit to the motor M will remain open, so that the motor will not be energized and the instructional tape T will not advance to the next frame. Upon such an occurrence, the student will press the button "E" thereby closing the switch E to which it is connected, and causing the completion of a circuit from line L-2 through the switch E and the error counter 17 to line L-1. Hence, there will be obtained a count of the number of frames presented to the student, and the number of errors made by the student.

There is also preferably provided in the apparatus 10 a resetting arrangement including a re-set switch SW-R connected to the motor M in parallel with the capacitor C-1. Thereby, upon completion of the frames on the instructional tape T, the spools 13 and 14 are placed in reverse positions and the re-set switch SW-R is closed to cause the motor M to rewind the tape T onto the supply spool, as is well known in the art. The capacitor C-1 is used to reduce noise in adjacent equipment.

An instructor monitors the activities of one or more student, being provided at a remote location with an instructor's console, generally designated 30, and which includes a timer 35, a frame counter 36 with re-set button 36R and an error counter 37 with re-set button 37R the counters 36 and 37 being connected, by suitable circuitry as illustrated with the switches 28 and E so that the counters 36 and 37 will show, respectively, the same counts as the counters 16 and 17. A digital display minute-and-tenths operator controlled timer 38 is also provided at the instructor's console 30. It will be understood that an instructor's station may be provided with a plurality of timers and counters so that a number of students may be under the guidance of a single instructor.

In accordance with the present invention, a student is initially evaluated as to such general matters as age, scholastic achievement level, etc., and is then provided with an apparatus 10 and an instructional tape T therein of relatively simple subject matter, based upon the student's own background as indicated. The instructor alerts the student to begin, at the same time starting the minute-and-tenth timer 38. The student then starts timer 15, examines the material in the frame displayed by the window 12, and when he has arrived at a decision as to which answer is the correct one, presses the corresponding one of the answer buttons "A . . . D". If his answer is correct, the motor M will be energized, the frame counters 16 and 36 will be actuated to indicate the completion of one frame, and the motor M will drive the reel system 13, 14 to present the next frame. Where the student makes an erroneous choice of answers, depressing the wrong button will not cause energization of the motor M and the instructional tape T will not advance. The student will then push the error button "E", and the error counters 17 and 37 will thereby be actuated, and the frame counters 16 and 36.

Figures 3A, 3B:
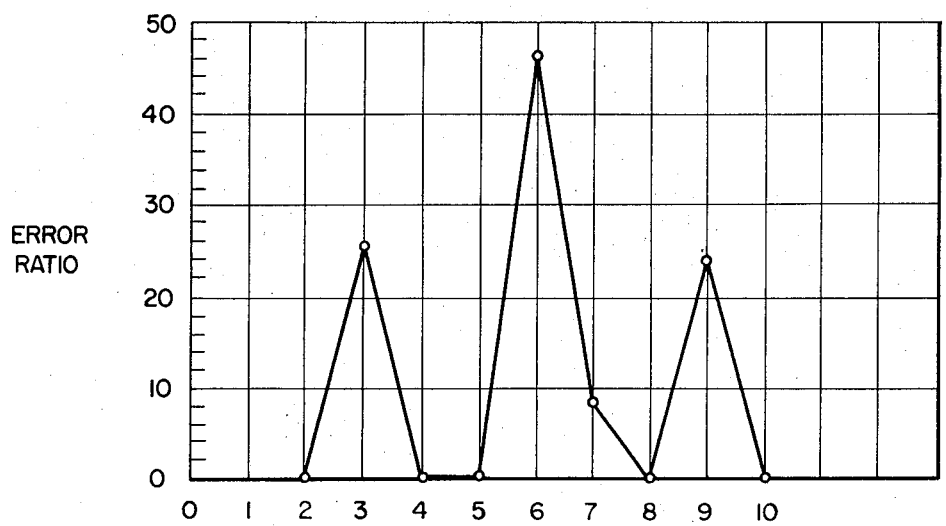
FIG. 3A is a log of a test of a particular student.
FIG. 3B is a graph made from the log of FIG. 3A.

As the testing proceeds, the instructor will, at the end of each three minute period, note the number of frames and errors counted by the counters 36 and 37 on a log such as illustrated in FIG. 3A, and re-sets these counters by actuating the re-set buttons 36R and 37R after each such 3 minute period.

After the 30 minute testing period, the instructor can, for convenience, prepare a graph of the information from the log, the graph being shown in FIG. 3B. The graph of FIG. 3B shows clearly that during the third 3 minute period, a significant number of errors were made, this conclusion being reinforced by the number of errors made in the sixth and ninth 3 minute time periods. The student whose test was thus logged and graphed is thereby determined to have a span of attention of approximately 9 minutes.

Thereafter, the student is given programmed instruction from suitable apparatus which displays information and provides the opportunity for question answering, but is limited to 9 minute periods. At the end of each 9 minutes, the student is required to occupy himself with diversionary material for short periods, of, for example, 2 to 4 minutes. The diversionary material may be in the form of, for example, silent film strips or the like of subject unrelated to the subject being studied by the student through the use of the programmed instructional apparatus and receives continuing instruction for a period of the same length of time as initially determined to be his span of attention, in this case, 9 minutes. This pattern of span-of-attention instructional periods interrupted by brief diversionary periods is continued for a suitable length of time, usually totaling 1 hour.

Figures 4A, 4B:
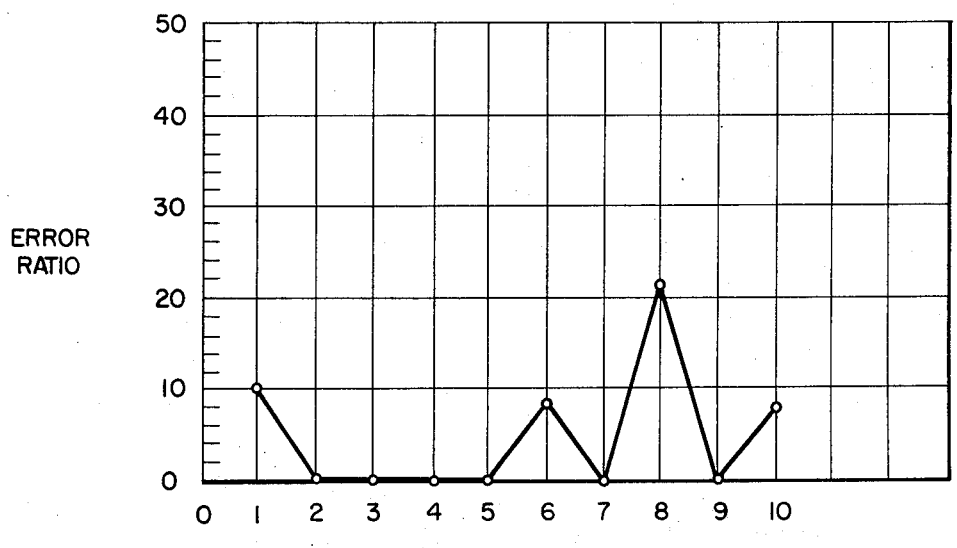
FIG. 4A is the log of the test of another student and FIG. 4B is a graph thereof.

Referring now to FIG. 4A, there may be seen the log of another student, FIG. 4B being the graph thereof. Referring to FIG. 4B, is will be seen that this second student's responses were substantially error free until the eighth 3 minute period, so that it is determined thereby that this second student has a span-of-attention of 24 minutes, and that the student's instructional scheduling is of an initial 24 minute instructional period, followed by the diversionary period of 2 to 4 minutes, and then a second 24 minute instructional period.

In general an error rate of 10 to 12 percent or more is significant, where material of low difficulty is presented, so that error rates below that range may be ignored in span-of-attention determination.

It will be understood that while there has been herein disclosed a specific apparatus which has been somewhat schematically shown in FIGS. 1 and 2, this has been for illustrative purposes only. For example, other means than a printed instructional tape T may be used to present the information and questions to the student, such means including, by way of example, film presentation and sound tape, used singly or together. In other words, sound tape, and/or film may be used in suitable apparatus provided with a frame counter, an error counter, and a timer. Further, the apparatus could be constructed with a circuit for automatically actuating the error counters upon making an incorrect choice, in lieu of the separate error button "E".

It will be obvious to those skilled in the art that various changes may be made without departing from the spirit of the invention and therefore the invention is not limited to what is shown in the drawings and described in the specification but only as indicated in the appended claims.

We claim:
1. A method of teaching comprising:
   a. presenting informational material and questions and multiple choice answers related thereto for a plurality of successive time periods of predetermined length,
   b. counting the total number of questions answered and the number of erroneous answers in each of said successive time periods,
   c. determining the attention span of a particular student by comparing the ratio of erroneous answers to total answers for each predetermined time period to determine the time period during which a significant increase in the ratio of erroneous answers occurs, and
   d. thereafter presenting instructional material to that student for the time of the attention span of that student as thus determined.

2. A method of teaching as set forth in claim 1, wherein the attention span is determined by an error to answer ratio of at least approximately 1 to 10.

3. A method of teaching as set forth in claim 1, and further comprising:
   presenting unrelated diversionary material to the student following the presentation of said instructional material.

4. A method of teaching as set forth in claim 3, wherein said diversionary material is presented for a time of approximately 2 to 4 minutes.

5. A method of teaching as set forth in claim 3, wherein following the presentation of said diversionary material, instructional material is presented to the student for the said attention time span.

6. A method of teaching as set forth in claim 3, wherein the presenting of instructional material for such attention span time periods and the presenting of diversionary material are continued alternately for approximately 1 hour.

* * * * *